UNITED STATES PATENT OFFICE.

ALBERT I. WORTHINGTON, OF ST. CLAIR, MICHIGAN.

HAIR-TONIC.

SPECIFICATION forming part of Letters Patent No. 375,860, dated January 3, 1888.

Application filed April 14, 1887. Serial No. 234,761. (No specimens.)

*To all whom it may concern:*

Be it known that I, ALBERT I. WORTHINGTON, a subject of the Queen of Great Britain, residing at St. Clair, in the county of St. Clair and State of Michigan, have invented certain new and useful Improvements in Hair-Lotions; and I do declare the following to be a full, clear, and exact description of the invention, such as will enable others skilled in the art to which it appertains to make and use the same.

My invention relates to the combination of certain ingredients forming a hair-lotion, which I have found to be an excellent remedy for curling the hair, removing dandruff, and increasing the growth of hair; and my invention consists in the combination of ingredients, as hereinafter set forth, and pointed out particularly in the claim.

In carrying out my invention I employ the following elements, in the proportions stated, to form, when compounded, two gallons of the lotion:

In a vessel containing one and a half gallon of soft water I add twelve ounces of wild indigo. In another vessel containing one and a half gallon of water I place twenty-four ounces of sweet-flag, and in a third vessel containing a like quantity of water I place the following ingredients: dandelion, twelve ounces; cloves, eight ounces; red pepper in the pod, eight ounces; lavender flower, seven ounces.

The foregoing ingredients, except the red pepper, are to be pulverized before placing in the water.

The contents of each vessel are boiled for one hour, and when cooled the contents of the three vessels are placed in one vessel and boiled until reduced to about two gallons. I then add one quart of alcohol to prevent fermentation. To this mixture a perfume may be added, if desired.

In applying to the hair to make it curl the hair should be dampened, and then placed in paper or tin-foil until dry. For treating the scalp the solution is to be applied with a sponge or brush.

Having thus set forth my invention, what I claim as new, and desire to secure by Letters Patent, is—

As a hair-tonic, the composition consisting of water, wild indigo, sweet-flag, dandelion, cloves, red pepper, lavender flower, and alcohol, in the proportions substantially as specified.

In testimony whereof I affix my signature in presence of two witnesses.

ALBERT I. WORTHINGTON

Witnesses:
R. B. WHEELER,
C. W. RUSSELL.